United States Patent [19]

Ritter et al.

[11] 4,399,342
[45] Aug. 16, 1983

[54] GRATING AND METHOD OF PRODUCTION THEREOF

[75] Inventors: Klaus Ritter; Hans Gött; Gerhard Ritter; Josef Ritter, all of Graz, Austria

[73] Assignee: EVG Entwicklungs u.-Verwertungs Gesellschaft mbH, Graz, Austria

[21] Appl. No.: 302,553

[22] Filed: Sep. 16, 1981

[30] Foreign Application Priority Data

Sep. 19, 1980 [AT] Austria .................................. 4695/80

[51] Int. Cl.³ .............................................. B23K 11/00
[52] U.S. Cl. .......................................... 219/58; 219/56; 219/156
[58] Field of Search ................. 219/56, 58, 156, 104, 219/107; 140/112; 228/182; 29/160; 404/25

[56] References Cited

U.S. PATENT DOCUMENTS

| | | | |
|---|---|---|---|
| 1,158,154 | 10/1915 | Albree | 29/160 X |
| 2,384,303 | 9/1945 | Heath | 219/58 X |
| 2,437,186 | 5/1944 | Collins | 219/58 X |
| 2,447,085 | 8/1948 | Odlum | 219/104 X |
| 2,736,347 | 2/1956 | Kaunitz | 140/112 |

Primary Examiner—B. A. Reynolds
Assistant Examiner—Catherine Sigda
Attorney, Agent, or Firm—Ernest F. Marmorek

[57] ABSTRACT

A grating of metal longitudinal strips (1) standing on edge in parallel with one another and narrower metal cross-strips (3) parallel with one another, is (for the achievement of higher load capacity) produced in such a way that in the longitudinal strips (1) slots (2) of changing width are incorporated, in which the inside width of the slot at the open end of the slot is chosen to the greater than, but on the contrary remote from this end of the slot is chosen to be less than the thickness of the cross-strips (3), cross-strips (3) are inserted into these slots (2) with the application to the strips (1, 3) of a welding voltage serving for the resistance welding, and with the application of pressure in the direction of insertion, so that material driven out from the edges of the slots forms weld beads (9) at the points of intersection of the strips.

4 Claims, 6 Drawing Figures

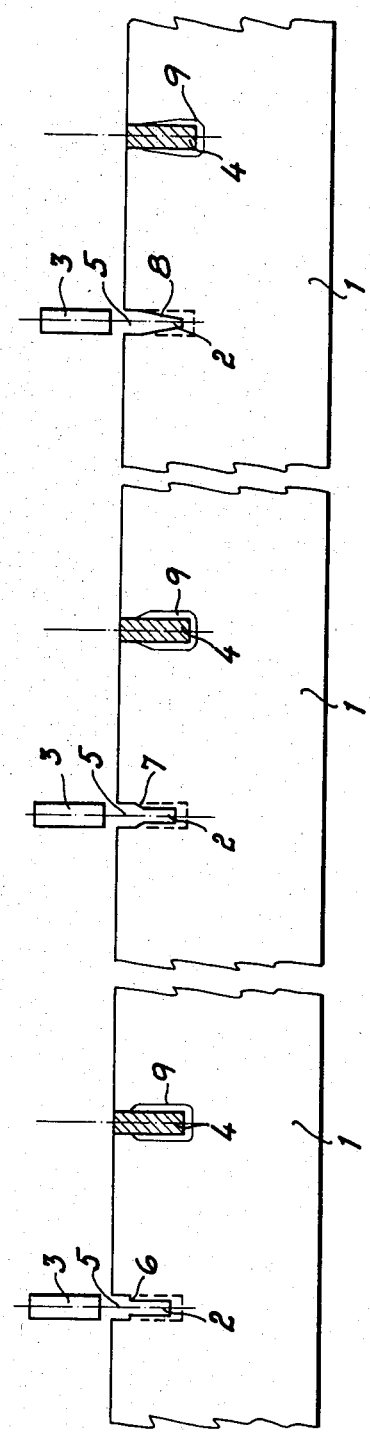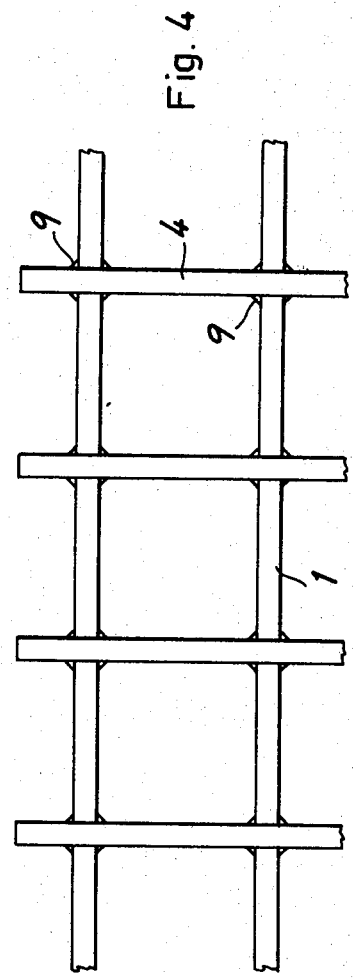

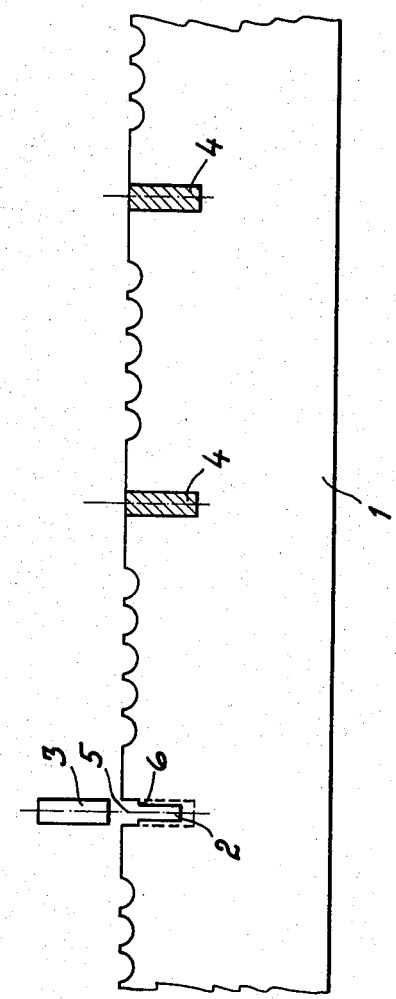
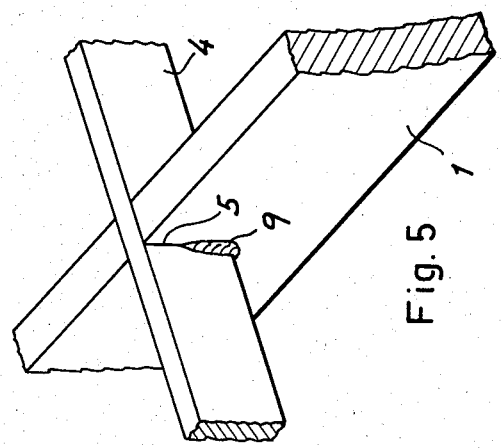

GRATING AND METHOD OF PRODUCTION THEREOF

The invention relates to a method of producing a grating in the form of a first family of metal strips standing on edge in parallel with one another, and at right angles thereto a second family of narrower metal strips likewise parallel with one another, which are inserted into slots, opening to one side, in the strips of the first family and which terminate flush with the top edges of the first strips.

Gratings of this kind are known as "insert-gratings" and are known, for example, from DE A No. 28 53 623. In the case of the known insert-gratings, in order to ensure the holding together of the families of strips crossing one another, the slots in the first family of strips are curved in such a way that the strips of the second family are bent sideways out of the plane of the strip upon being pressed into the slots, whereby an essentially positive connection is achieved between the strips of the two families.

The supporting action of gratings in general depends upon the fact that a loading applied to any strip at any point has the tendency first of all to bend this strip in the plane of loading. Assuming that between all the strips of the families crossing one another there exists a force-locking or positive connection, this bending is now, because of a deformation of the loaded strip and of the forces thereby resulting between it and other still undeformed strips at the points of cross of the bars, transferred to other strips which are not themselves directly loaded, so that these other strips too are called upon to cooperate in bearing the load.

It is immediately clear that through a load which acts upon one strip of the first family, the tendency is awakened to pull the strips of the second family out of the slots in the loaded strip of the first family wherefore the supporting action is known insert-gratings formed only with force-locking or positive connection of the strips, is relatively limited. For ensuring the holding together of these insert-gratings, it has therefore always been necessary to weld the ends of the strips from which the insert gratings were formed, to a frame surrounding the whole grating.

In order to increase the load capacity of insert gratings, and in accordance with the U.S. Pat. No. 2,006,929 the narrower strips of the second family are at intervals which are equal to the distance between the respective strips of the first family, deformed in such a way that the points of deformation form local thickenings having a wedge cross-section directed downwards. The pressings of the strips of the second family into the slots in the strips of the first family is performed with simultaneous action of an electric current, so that the thickenings of the strips of the second family become connected to the edges of the slots in the strips of the first family through electrical resistance welding.

The local thickening of the strips of the second family is effected in the case of this method by an upsetting or rolling method in which material from the side of the strip which is not being thickened gets driven over towards the side of the strip which is to be provided with thickenings. This process of deformation inevitably considerably reduces the height of the strips of the second family in the regions of the thickenings, which has the result of a very sharp reduction in the moment of resistance a factor which is basic to the loading capacity of the strip of the strips of the second family, in particular if one considers that the height of a strip enters into the calculation of the moment of resistance as its square. That means that a large part of the existing material of the strips of the second family cannot be called upon for carrying loads so that the gain in load capacity achieved by the welded connection of the points of cross of the strips of the grating largely disappears again, if not completely.

According to the present invention in a method of producing a grating comprising a first family of metal strips standing on edge in parallel with one another and, at right angles thereto, a second family of narrower metal strips likewise parallel with one another and which are inserted into slots, open to one side, in the strips of the first family and terminate flush with the top edges of the strips of the first family, the strips of the first family are formed with slots of changing width, the width of the slots at the open end of the slot being greater than, and the width of the slots at the other end of the slot less than the thickness of the strips of the second family, and the insertion of the strips of the second family into the slots in the strips of the first family being effected by applying a welding voltage serving for resistance welding together the strips of the two families and by the action of pressure in the direction of insertion, whereupon material driven out from the edges of the slots forms weld beads at the points of intersection of the strips.

A rigid welded connection of the points of cross of the strips of the two families can thus be ensured and simultaneously the moment of resistance may be wholly utilized, which follows from the area of cross-section of the strips of the individual families.

According to a preferred procedure which enables particularly easy joining together of the grating out of the individual strips, there are incorporated into the strips of the first family slots which in the region near the open end of the slot exhibit slot edges paralled with one another, the distance apart of which is only slightly greater than the thickness of the strips of the second family, so that during the process of insertion these slot edges act as guidance for these strips.

Since gratings of the species in accordance with the invention are employed particularly in industrial installations for stairs and as working platforms which let through the light and upon which one may walk about, or the like, particular importance is to be attached to the fact that the danger of skidding possibly caused by fouling by oils or lubricants, can be largely excluded. In accordance with a further development of the method according to the invention, therefore, simultaneously with the incorporation of the slots into the strips of the first family, profilings are incorporated into those edges of the strips at which the slots emerge.

A particularly economical production of the gratings is possible when the strips of the first family are drawn off coils and with intermittent advance of the strips, at the time of the pauses in the feed, the slots, and if necessary the profilings, are incorporated, preferably by punching, into the edges of the strips. Also the insertion and welding into these slots of the strips of the second family preferably likewise drawn off coils and cut to length as needed can also be effected in the pauses.

The drawing off of the strips from coils allows very long strips to be employed, whereby the occurence of unavoidable waste pieces is reduced, and simultaneously saves time because as soon as the ends of the strips have been introduced into the machine it can produce for a long time without interruption, without another and always time-wasting loading process being necessary.

A grating produced according to the method in accordance with the invention is recognisable by the features that at the points of cross of the strips of the two families of strips the lines of intersection of these strips are covered over by weld beads which extend respectively from the bottom of the slot and the bottom edge, resting on the latter, of the strip which has been inserted in the slot, up to near the open end of the slot, in particular up to the guidance region of the slot.

Examples of producing a grating in accordance with the invention will now be explained in greater detail with reference to the accompanying drawings in which:

FIGS. 1 to 3 show elevations of strips of the first family having differently shaped slots;

FIG. 4 is a plan view of part of a grating produced in accordance with the invention, from strips crossing one another;

FIG. 5 is an axonometric elevation of a point of cross of two strips; and,

FIG. 6 is an elevation of a strip of the first family with a profiled strip edge.

In FIGS. 1–3 there may be seen different strips 1 standing on edge, suitable for the first family of strips of the grating which is to be produced, into which are incorporated slots 2 open towards the top edge. By a welding and jointing machine, which is not shown, because it does not form an object of the invention, a strip 3 of a second family of strips is held above a free slot 2 in each strip 1 in readiness for pressing in and simultaneous welding, whilst another strip 4 of the second family has already been pressed into the associated slot and welded to the strip 1 of the first family.

Near the open end of the slot the slots 2 have a guidance region 5 having slot edges parallel with one another, the distance apart of which is slightly greater than the thickness of the strips 3 of the second family, so that each strip 3 may be easily introduced into the associated slot 2.

At a distance from the open top end of the slot the inside slot width is less than in the guidance region 5. The reduction in the slot width may occur either suddenly as shown in FIG. 1, in which a rectangular shoulder 6 is formed, or in accordance with FIG. 2, a transition region may be provided with an oblique shoulder 7. Finally, as shown in FIG. 3, beyond the guidance region 5, the slot may gradually taper downwards in oblique flanks 8.

Upon pressing the strips 3 of the second family into the slots 2 provided for them in the strips of the first family with simultaneous action of current, contact occurs first of all between the strips 1 and 3 in a region of narrowly restricted area along the shoulders 6 and 7 respectively or along the sloped flanks 8, which leads under the action of the current to a powerful local heating of the material and thereby to plasticizing of the material in the contact region, so that the strip 3 by driving the plasticized material sideways may be pressed into the slot up to its final position. The material which has been driven out sideways moreover forms on the lines of intersection of the welded strips 1 and 4, as may be seen in FIGS. 4 and 5, a weld bead 9 which extends along those zones out of which material has been driven during welding.

As may be seen finally from FIG. 6, into that edge of the strip 1 at which the open ends of the slots emerge there may be incorporated a profiling 10, being preferably likewise punched simultaneously with the punching of the slots 2, whereby a considerable increase in safety against skidding when walking on the grating can be achieved.

We claim:

1. A method of producing a grating comprising a first family of metal strips, each of said strips defining top and bottom edges and first and second sides extending between said edges, each strip standing on its bottom edge parallel with each other strip and defining a plurality of slots, each slot defining a first end opening into said top edge of said strip; and, at right angles thereto, a second family of narrower metal strips likewise parallel with one another and which are inserted into said slots in said strips of said first family and terminate flush with said top edges of said strips of said first family, in which said slots of said strips of said first family are formed with changing width, said width of said slots at one end of said slots being greater than, and said width of said slots at the other end of said slots less than the thickness of said strips of said second family, said slots in said first family of strips defining near said open ends of said slots sides parallel with one another, spaced apart for a distance which is only slightly greater than said thickness of said strips of said second family, and the insertion of said strips of said second family into said slots in said strips of said first family being effected by applying a welding voltage serving for resistance welding together said strips of said two families and by the action of pressure in the direction of insertion, whereupon material driven out from edges defined by said slots forms weld beads at points of intersection of said strips up to a point near said open end of the slot.

2. A method according to claim 1, said parallel slot edges acting as guidance for said strips of said second family during insertion.

3. A grating produced by a method according to claim 1, wherein each of said slots defines a bottom portion, and each of said second family of metal strips defines a bottom edge adjacent said bottom portions of respective slots, said weld beads extending from said bottom portion of said slots and said bottom edge of said strips which have been inserted in said slots, up to a point near said open end of said slot.

4. A grating according to claim 3, in which each of said slots defines a guidance region up to which respective weld beads extend.

* * * * *